United States Patent Office 3,541,093
Patented Nov. 17, 1970

3,541,093
PROCESS FOR THE PREPARATION OF 1H-IMIDAZO[4,5-b]PYRAZINE-2-ONES
Roger J. Tull, Metuchen, and Peter I. Pollak, Scotch Plains, N.J., assignors to Merck & Co., Inc., Rahway, N.J., a corporation of New Jersey
No Drawing. Filed Aug. 22, 1968, Ser. No. 754,711
Int. Cl. C07d 51/76
U.S. Cl. 260—250    26 Claims

ABSTRACT OF THE DISCLOSURE

A process is described for the preparation of 1H-imidazo[4,5-b]pyrazin-2-ones that comprises treating a 2,3-diaminopyrazine with a cyclization reagent. The products prepared by the process of this invention have activity as antihypertensive agents.

---

This invention relates to a process for the preparation of new organic compounds and to chemical intermediates which are useful in such process. It relates more particularly to a process for the preparataion of 5-substituted amino-6-chloro-1H-imidazo[4,5-b]pyrazin-2-ones represented by the Formula I:

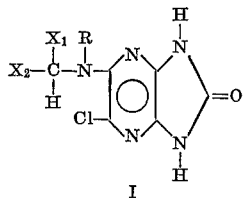

wherein R is hydrogen or alkyl of 1 to 5 carbons; $X_1$ is either hydrogen or alkyl of 1 to 5 carbons; and $X_2$ is hydrogen, alkyl of 1 to 5 carbons which may bear a lower-alkoxy substituent, monocyclic aryl which may bear halogen substituents, pyridyl, amino-lower alkyl wherein the terminal nitrogen atom is di-substituted with lower-alkyl or can be part of a saturated 5- or 6-membered heterocyclic ring. The heterocyclic ring can be formed by a divalent 4- or 5-membered chain, optionally interrupted with either a nitrogen atom which optionally can be lower alkyl substituted, or an oxygen atom. Among such heterocyclic moieties are piperazino, piperidino, pyrrolidinyl and morpholino. Compounds of Formula I are orally active, relatively non-toxic, highly effective antihypertensive agents with a moderate degree of diuretic and saluretic activities.

Compounds of Formula I are tautomeric in nature and exist as 1H-imidazo[4,5-b]pyrazin-2-ones (the structure shown in Formula I) and as the corresponding 1H-imidazo[4,5-b]pyrazin-2-ols (the structure shown by Formula Ia and Ib) as follows:

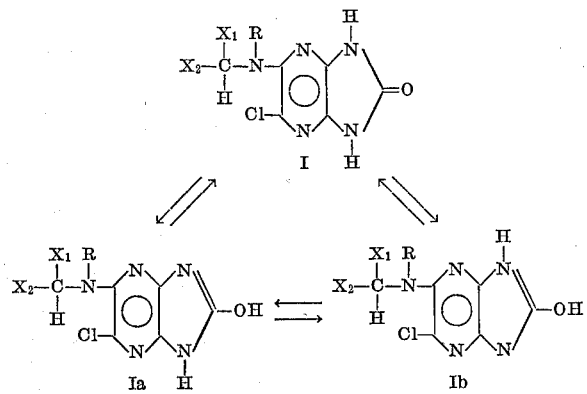

Although the enol forms represented by Formulae Ia and Ib may comprise a significant or predominant form of a given compound, for the sake of brevity, only one form is referred to throughout this specification. It should be understood, however, that the present invention is inclusive of the production of compounds represented by all tautomeric structures.

The compounds of this invention can be administered in the form of pills, tablets, capsules, elixirs, injectable preparations, and the like, in compositions which comprise one or more of the compounds of Formula I as the only active ingredient or in combination with other therapeutic ingredients. The compounds are advantageously administered at a dosage range of from about 5 mg. per day to about 750 mg. per day per 70 kg. of body weight. The dosage can be given in sub-divided amounts on a two-four times a day regimen.

The present invention is based upon the discovery that compounds of Formula I can be obtained from a 2,3-diamino-5-substituted amino-6-chloropyrazine by a reaction which is depicted by the following equation:

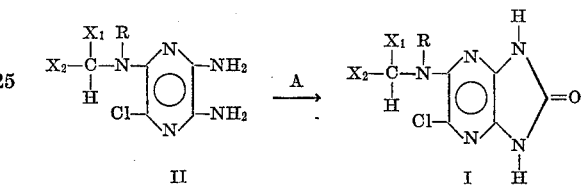

wherein $X_1$, $X_2$ and R are as defined above, and A is a cyclizing reagent such as a di(lower alkyl) iminocarbonate, di(lower alkyl)carbonate, carbamyl chloride, carbamyl bromide, N-lower alkyl-carbamyl chloride, N-lower alkyl-carbamyl bromide, N,N-di(lower alkyl)carbamyl chloride, N,N-di(lower alkyl)carbamyl bromide, phosgene, carbamyl dibromide, alkali metal cyanates, urea, substituted ureas, and lower alkyl-haloformates.

Compounds represented by Formula I can be prepared from compound II by use of any of the several alternative reagents listed above. Thus, compound II can be converted to compound I by reaction with a di-(lower alkyl)iminocarbonate. The reaction is carried out in the presence of an inert solvent such as aromatic hydrocarbons or dimethylformamide at temperatures between about 25° C. and about 150° C. for a period of time sufficient to obtain substantial yields of compound I, usually between about 4–24 hours. The reaction is conducted in the presence of about one equivalent of a strong acid as, for example, concentrated hydrochloric acid, hydrobromic acid, sulfuric acid or the like. The mixture can be cooled to precipitate an intermediate with a lower alkoxy group in the 2-position which is obtained by filtration or else the mixture can be used directly in the next step by refluxing in the presence of additional strong acid for a period between about 10 to 24 hours. The mixture is cooled and neutralized with a base to precipitate compound I which is then recovered by filtration.

When empolying as reactant, a carbonyl chloride, carbonyl bromide, alkali metal cyanate, or urea or its derivatives, cyclization is effected in the presence of a strong acid such as concentrated hydrochloric acid, hydrobromic acid, or sulfuric acid. The temperature of the reaction mixture is dependent upon the particular reactant employed and is within the range of from about 20° C. to about 100° C., except when employing urea or its derivatives, when the reaction is carried out at somewhat elevated temperatures within the range of from about 140° C. to about 200° C. In each case, upon completion of the reaction, the reaction mixture is neutralized with an alkali metal hydrooxide to a pH of between about 5 and about 7 and the product is obtained by filtration of the reaction mixture. When employing an alkali metal cyanate, the filtered product is refluxed in an inert solvent subsequent to the neutralization step and the product therefrom is obtained by filtration.

When employing carbamyl chloride or bromide or alkyl derivatives thereof, the cyclization of compound II is effected by heating the reaction mixture to a temperature of between about 70° C. and about 120° C. for a period of time to effect the desired amine substitution reaction, usually between about 1 hour and about 4 hours. Thereafter, the temperature of the reaction mixture is raised to a temperature between about 130° C. and about 170° C. and maintained until the desired cyclization reaction is effected, usually between about 2 to 6 hours. The reaction mixture is then cooled to ambient temperature and neutralized with a base such as an alkali metal hydroxide to a pH of between about 5 and about 7. Compound I is precipitated from the cooled neutralized reaction mixture and recovered as, for example, by filtration.

When reacting compound II with a lower alkyl chloroformate, a lower alkyl bromoformate or a di-(lower alkyl) carbonate, to obtain compound I, the reaction is carried out by heating the reaction mixture to a temperature of between about 25° C. and about 100° C. When employing the lower alkyl chloro or bromoformate, the reaction is conducted in a solvent such as pyridine or quinoline or in an inert solvent such as an aromatic hydrocarbon or dimethylformamide in the presence of an acid acceptor such as a tertiary (lower alkylamine). The reaction is carried out for a period of time of between about 1 to 6 hours, and thereafter the solvent is removed from the reaction mixture by distillation in vacuo. The residue is then suspended in an inert solvent as, for example, t-butylbenzene, xylene, toluene or chlorobenzene or the like and refluxed for about 1 to 5 hours. The reaction mixture is then cooled to about ambient temperature and the product is recovered by filtration. When employing the di-(lower alkyl) carbonate as the reactant, the reaction mixture can include an inert aromatic solvent or can employ an excess of the di(lower alkyl) carbonate as solvent and is heated to a temperature sufficiently high to facilitate removal of the lower alkanol by-product by distillation. When the evolution of alkanol from the reaction mixture substantially ceases, the mixture is coled to about ambient temperature, diluted with a lower alkanol solvent and the product is obtained by filtration.

The starting material represented by Formula II, 2,3-diamino-5-substituted amino-6-halopyrazine can be prepared by the reaction scheme shown by the following equation:

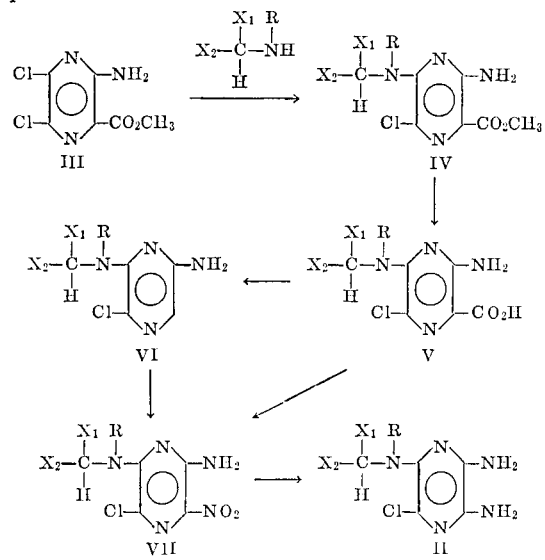

wherein $X_1$, $X_2$ and R are as defined above.

Compound IV, methyl 3-amino-5-substituted amino-6-chloropyrazinoate is prepared by refluxing a solution of compound III, methyl 3-amino-5,6-dichloropyrazinoate, and the appropriate amine $(X_1,X_2CH)(R)NH$ in a lower alkanol such as methanol, ethanol, propanol and the like for from 1 to about 4 hours. The product separates from the solution and after cooling to about ambient temperature, is collected by filtration.

Compound V, 3-amino-5-substituted amino-6-chloropyrazine carboxylic acid is prepared by reacting compound IV, methyl 3-amino-5-substituted amino-6-chloropyrazinoate with an alkali metal hydroxide such as sodium hydroxide or potassium hydroxide in aqueous solution. The reaction temperature is maintained between about 20° C. and about 100° C. for a period of time sufficient to effect the desired reaction, usually between about ½ to 3 hours. Thereafter, the solution is cooled to a temperature of between about 0° C. and about 5° C., and acidified with a mineral acid such as hydrochloric acid, hydrobromic acid, sulfuric acid and the like to a pH of about 3. The compound V is thereafter collected on the filter.

Compound VI is prepared by reacting compound V with an acid at about ambient temperature for about 2 to 5 hours. The reaction is usually carried out in an aqueous medium which is thereafter neutralized with an alkali metal hydroxide to precipitate compound VI, 3-amino-5-substituted amino-6-chloropyrazine. The product is then removed by filtration.

Alternatively, compound VI is prepared by suspending compound V in a high boiling aromatic solvent such as xylene and heating to between 125 and 150° C. for from 1 to about 5 hours. On cooling to about ambient temperature and dilution with an aliphatic hydrocarbon such as n-hexane, the product is precipitated and collected.

Compound VII, 2-nitro-3-amino-5-substituted amino-6-chloropyrazine is obtained by reacting compound VI with nitric acid in the presence of sulfuric acid. The reaction mixture is maintained at a temperature of between about −5° C. and about +5° C. for a period of about 2 hours. Thereafter, the temperature of the reaction mixture is elevated to a temperature of between 20° C. and about 30° C. and that temperature is maintained for a period between about 1 to 3 hours. The mixture is then poured into a mixture of ice and water, and it is neutralized with an alkali metal hydroxide. The product, 2-nitro-3-amino-5-substituted amino-6-halopyrazine is thereafter recovered by filtration.

Alternatively, compound VII, 3-amino-2-nitro-5-substituted amino-6-chloropyrazine, is prepared directly by concomitant decarboxylation and nitration of compound V, by treating a solution of compound V in concentrated sulfuric acid with concentrated nitric acid over ½ to one hour at between 5 and 20° C. The reaction mixture is then quenched by pouring it onto ice, and the precipitated product is collected and washed well with water.

Compound II can be prepared from compound VII by either catalytic hydrogenation or chemical reduction. When employing a chemical reduction procedure, compound VII is treated with a metal such as iron dust, zinc dust or the like in the presence of a strong acid such as hydrochloric acid, sulfuric acid, hydrobromic acid or the like. The reduction is carried out in a diluent such as a lower alkanol or water or mixtures thereof. The reaction mixture is refluxed for a period of time sufficient to effect the desired reaction, usually between about 1 to 5 hours. The reaction mixture is then cooled to about ambient temperature and filtered. The filtrate is then neutralized with an alkali metal hydroxide to give compound II.

Alternatively, compound II can be prepared by hydrogenating compound VII in the presence of a hydrogenation catalyst. Suitable hydrogenation catalysts which can be used are Group VIII metals of the Periodic Table or their oxides or mixtures thereof. Particularly suitable catalysts are platinum or palladium, Raney nickel or Raney copper either unsupported or on a catalyst support such as activated carbon. The reactions are carried out in an inert solvent including aromatic hydrocarbons such as benzene or toluene; lower alkanols such as methanol, ethanol, propanol, isopropanol or n-butanol; benzyl alcohol, dimethylformamide, carbon tetrachloride; lower alkyl alkanoates such as ethyl acetate or the like. Suitable temperatures which can be employed are those within the range of from about 20° C. to about 50° C. for a period of time sufficient to effect absorption of close to the theoretical amount of hydrogen required. The reaction pressure can be varied over a wide range between 15 p.s.i. and about 200 p.s.i. Compound II can be obtained by separation of the catalyst and removing the solvent in vacuo, however the diamine, II, is very labile and it is preferable to use the crude reaction mixture directly in the process of this invention for the preparation of compound I.

The following examples illustrate the present invention and are not intended to limit the same.

EXAMPLE 1

5-dimethylamino-6-chloro-1H-imidazo[4,5-b]pyrazin-2-one

*Step A.*—A suspension of methyl 3-amino-5,6-dichloropyrazinoate (178 g., 0.8 mol) in 2-propanol (1.1 liters) is stirred while dimethylamine (200 g., 4.44 moles) in 2-propanol (2 liters) is added, and then mixture is refluxed for an hour. The product that separates is removed by filtration and dried. The yield is 177.2 g. (97%). After recrystallization from methanol the methyl 3-amino-5-dimethylamino-6-chloropyrazinoate melts at 145.5–146.5° C.

*Analysis.*—Calc. for $C_8H_{11}ClN_4O_2$ (percent): C, 41.66; H, 4.81; N, 24.29. Found (percent): C, 41.73; H, 4.52; N, 24.24.

*Step B.*—One mole of methyl 3-amino-5-dimethylamino-6-chloropyrazinoate is heated with one liter of 10% aqueous sodium hydroxide for one hour at 75° C. The solution is then cooled to a temperature of 0 to 5° C. and acidified with concentrated HCl to about pH 3. The product, 3 - amino-5-dimethylamino-6-chloropyrazinoic acid, M.P. 141–142° C., is obtained from the reaction mixture by filtration.

*Step C.*—One mole of 3-amino-5-dimethylamino-6-chloropyrazinoic acid is stirred with 10% aqueous hydrochloric acid at a temperature of 25–30° C. for three hours. The mixture is then neutralized with sodium hydroxide and the product, 3-amino-5-dimethylamino-6-chloropyrazine is collected by filtration.

*Step D.*—One mole of 3-amino-5-dimethylamino-6-chloropyrazine is slowly added to one liter of sulfuric acid (d. 1.4) at 0° C. Fuming nitric acid (300 cc.) is added dropwise to the reaction mixture over a period of one hour at 0–5° C. The mixture is stirred at 0° C. for about one hour and finally at 25° C. for one hour. The reaction mixture is then poured into 15 liters of ice and water and neutralized with sodium hydroxide. The product, 2-nitro-3-amino-5-dimethylamino-6-chloropyrazine is collected by filtration.

*Step E.*—One mole of 2-nitro-3-amino-5-dimethylamino-6-chloropyrazine is treated with 500 grams of iron dust and 90 cc. of concentrated HCl in 700 cc. of ethanol and 175 cc. of water. The resultant mixture is refluxed for two hours and cooled. The cooled mixture is filtered and the filtrate is neutralized with sodium hydroxide. The product, 2,3-diamino-5-dimethylamino-6-chloropyrazine is obtained by filtration.

*Step F.*—A mixture of 1 mole of 2,3-diamino-5-dimethylamino-6-chloropyrazine and 1 mole of dimethylcarbamyl chloride is heated to a temperature of 90–100° C. for two hours. Thereafter, the reaction temperature is raised to 150° C. and maintained at that temperature for four hours. The reaction mixture is then cooled, diluted with one liter of water and neutralized with sodium hydroxide. The product 5-dimethylamino-6-chloro-1H-imidazo[4,5-b]pyrazin-2-one is obtained from the reaction mixture by filtration, and has M.P. 248–249° C.

Employing the procedure of Example 1, Step A, but substituting for the dimethylamine utilized in Step A an equivalent amount of the amine, $(X_1X_2CH)(R)NH$, described in Table I, there are produced the methyl 3-amino-5-$(X_1X_2CH)(R)$N-6-chloropyrazinoates also described in Table I, which on treatment with sodium hydroxide as in Step B yields the 3-amino-5-

$(X_1X_2CH)(R)N$ 6-chloropyrazinoic acids described in Table I.

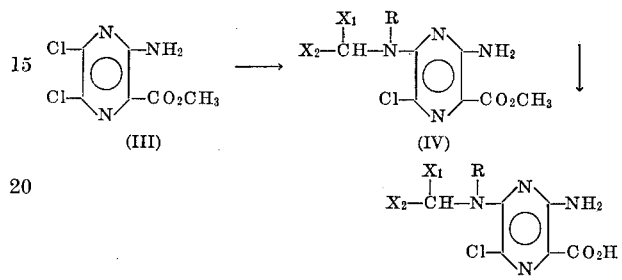

TABLE I

| $X_1$ | $X_2$ | R | M.P. of IV (° C.) |
|---|---|---|---|
| H | H | H | 221–222 |
| H | $C_2H_5$— | H | 138–140 |
| H | n-$C_3H_7$— | H | 140–142 |
| H | $CH_3OCH_2$— | H | 142–144 |
| H | Cl—C₆H₄— | H | 136–137 |
| H | pyridyl | H | 190–191 |
| H | pyridyl | H | 170–171 |
| H | pyridyl | H | 95–97 |
| H | $CH_3$— | H | 149–150 |
| H | $(CH_3)_2NCH_2$— | H | 257 |
| H | $(C_2H_5)_2NCH_2$— | H | 114–116 |
| H | $(CH_3)_2N(CH_2)_3$— | H | 170–171 |
| H | $CH_3$— | $C_2H_5$— | 99–101 |
| H | $CH_3$—N⟨⟩N—$(CH_2)_2$— | H | 148–149 |
| H | O⟨⟩N—$(CH_2)_2$— | H | 158–160 |

EXAMPLE 2

5-methylamino-6-chloro-1H-imidazo[4,5-b]pyrazin-2-one

*Step A.*—One mole of 3-amino-5-methylamino-6-chloropyrazinoic acid is heated in 500 cc. of xylene at 130–140° C. for three hours. The resultant mixture is cooled to 25° C. and diluted with 500 cc. of hexane. The product, 3-amino-5-methylamino-6-chloropyrazine is obtained by filtration.

*Step B.*—One mole of 3-amino-5-methylamino-6-chloropyrazine is slowly added to one liter of sulfuric acid (d. 1.4) at 0° C. Fuming nitric acid (300 cc.) is added dropwise to the reaction mixture over a period of one hour at 0–5° C. The mixture is stirred at 0° C. for about one hour and at 25° C. for one hour. The reaction mixture is then poured into 15 liters of ice and water and neutralized with sodium hydroxide. The product, 2-nitro-3-amino-5-methylamino-6-chloropyrazine is collected by filtration.

*Step C.*—One mole of 2 - nitro - 3 - amino - 5 - methylamino-6-chloropyrazine is treated with 500 grams of iron dust and 90 cc. of concentrated HCl in 700 cc. of ethanol and 175 cc. of water. The resultant mixture is refluxed for two hours and cooled. The cooled mixture is filtered and the filtrate is neutralized with sodium hydroxide. The product, 2,3-diamino-5-methylamino-6-chloropyrazine is obtained by filtration.

*Step D.*—A mixture of 1 mole of 2,3-diamino-5-methylamino-6-chloropyrazine and 1 mole of carbamyl chloride is heated to a temperature of 90–100° C. for two hours. Thereafter, the reaction temperature is raised to 150° C. and maintained at that temperature for four hours. The reaction mixture is then cooled, diluted with one liter of water and neutralized with sodium hydroxide. The product, 5-methylamino-6-chloro-1H-imidazo[4,5-b]pyrazin-2-one is obtained from the reaction mixture by filtration, M.P. >280° C.

Using the procedure of Example 1, Step C, or Example 2, Step A, but substituting for the pyrazinoic acids used therein, an equivalent amount of the 3-amino-5-($X_1X_2$-CH)(R)N-6-chloropyrazinoic acids described in Table II, there are produced the 3-amino-5-($X_1X_2$CH)(R)N-6-chloropyrazines also described in Table II which on nitration as described in Example 1, Step D followed by reduction as in Example 1, Step E, yields the 2-nitro-3-amino - 5 - ($X_1X_2$CH)(R)N-6-chloropyrazines and 2,3-diamino-5-($X_1X_2$CH)(R)N-6-chloropyrazines respectively, also described in Table II.

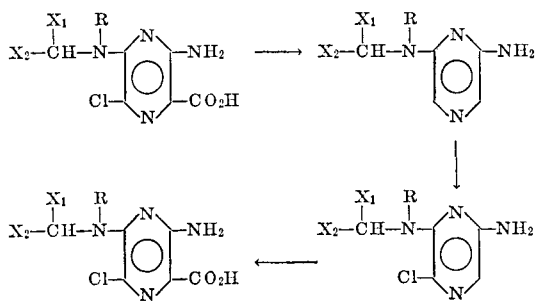

TABLE II

| $X_1$ | $X_2$ | R |
|---|---|---|
| H | $C_2H_5$— | H |
| H | n-$C_3H_7$— | H |
| H | $CH_3OCH_2$— | H |
| H | Cl—⟨phenyl⟩— | H |
| H | ⟨pyridyl-N⟩ | H |
| H | ⟨pyridyl-N⟩ | H |
| H | ⟨pyridyl-N⟩ | H |

EXAMPLE 3

5-n-propylamino-6-chloro-1H-imidazo[4,5-b]pyrazin-2-one

Equal parts of 2,3-diamino-5-n-propylamino-6-chloropyrazine, concentrated hydrochloric acid and urea are mixed and heated slowly to 140° C. and held at 140–150°. C. for two hours. The mixture is cooled, diluted with one liter of water and neutralized with sodium hydroxide. The product, 5-n-propylamino-6-chloro-1H-imidazo[4,5-b]pyrazin-2-one is obtained by filtration, M.P. 215–216° C.

EXAMPLE 4

5-n-butylamino-6-chloro-1H-imidazo[4,5-b]pyrazin-2-one

Equal parts of 2,3-diamino-5-n-butylamino-6-chloropyrazine, concentrated hydrochloric acid and 1,3-diethylurea are mixed and heated slowly to 180° C. and held at 180–200° C. for two hours. The mixture is cooled, diluted with one liter of water and neutralized with sodium hydroxide. The product, 5-n-butylamino-6-chloro-1H-imidazo[4,5-b]pyrazin-2-one is obtained by filtration, M.P. 197–198° C.

EXAMPLE 5

5-(2-methoxyethylamino)-6-chloro-1H-imidazo[4,5-b]pyrazin-2-one

One mole of 2,3-diamino-5-(2-methoxyethylamino)-6-chloropyrazine is dissolved in one liter of water containing one mole of concentratted HCl. To this solution is added 4 grams of potassium cyanate and the resultant mixture is heated at 50° C. for 6 hours. The mixture is cooled and neutralized with sodium hydroxide to pH 6. The mixture is then filtered and the resulting solid is dried in air. The solid is then suspended in 1 liter of xylene and the mixture is refluxed for 6 hours. The mixture is then cooled and the product, 5-(2-methoxyethylamino)-6-chloro-1H-imidazo[4,5-b]pyrazin-2-one is obtained by filtration and then dried, M.P. 229–231° C.

EXAMPLE 6

5-p-chlorobenzylamino-6-chloro-1H-imidazo[4,5-b]pyrazin-2-one

One mole of 2,3-diamino-5-p-chlorobenzylamino-6-chloropyrazine is dissolved in one liter of water containing one mole of concentrated hydrochloric acid. Two moles of phosgene are passed into the solution over a period of two hours while maintaining the reaction temperature at 25–30° C. and neutralized with sodium hydroxide. The product, 5-p-chlorobenzylamino-6-chloro-1H-imidazo[4,5-b]pyrazin-2-one is collected by filtration, M.P. 270–271° C.

EXAMPLE 7

5-(2-pyridylmethylamino)-6-chloro-1H-imidazo[4,5-b]pyrazin-2-one

A mixture of one mole of 2,3-diamino-5-(2-pyridylmethylamino)-6-chloropyrazine is treated with two moles of diethyl carbonate and heated to a temperature of 100° C. for 12 hours. The mixture is then cooled to 25° C., treated with 500 cc. of isopropyl alcohol and the product, 5-(2-pyridylmethylamino) - 6 - chloro-1H-imidazo[4,5-b]pyrazin-2-one is then obtained by filtration, M.P. 280° C.

EXAMPLE 8

5-(3-pyridylmethylamino)-6-chloro-1H-imidazo[4,5-b]pyrazin-2-one

To a solution of one mole of 2,3-diamino-5-(3-pyridylmethylamino)-6-chloropyrazine in 500 cc. of pyridine is added 1.2 moles of methyl chloroformate over a period of 30 minutes. The mixture is then heated at 50° C. for 3 hours and the solvent is distilled off in vacuo. The resultant mixture is suspended in 1 liter of t-butylbenzene, refluxed for three hours and then cooled. The product, 5-(3-pyridylmethylamino)-6-chloro - 1H - imidazo[4,5-b]pyrazin-2-one is then collected by filtration, M.P. 271–272° C.

EXAMPLE 9

5-(4-pyridylmethylamino)-6-chloro-1H-imidazo[4,5-b]pyrazin-2-one

One mole of 2,3-diamino-5-(4-pyridylmethylamino)-6-chloropyrazine is dissolved in 1 liter of water containing 1 mole of concentrated HCl. Two moles of O,O-dimethyliminocarbonate are added and the resultant mixture is heated to 50° C. for 6 hours. The mixture is then cooled to 5° C. The precipitate is collected on a filter and then refluxed in 1 liter of concentrated hydrochloric acid for 20 hours. The mixture is then concentrated by distillation to 350 cc., diluted with 1 liter of water and neutralized with sodium hydroxide. The product, 5-(4-pyridylmethyl-amino)-6-chloro-1H-imidazo[4,5-b]pyrazin-2-one is collected by filtration.

EXAMPLE 10

5-ethylamino-6-chloro-1H-imidazo[4,5-b]pyrazin-2-one

Step A.—A solution containing 34.5 g. (0.159 mole) of 3-amino-5-ethylamino-6-chloro-pyrazinoic acid in 140 ml. of sulfuric acid is treated over the course of 30 minutes with 11 ml. (0.176 mole) of nitric acid mixed with 11 ml. of sulfuric acid. The temperature is held at 10–15° C. during the addition. After quenching the reaction mixture on ice, the product is filtered, washed with water, and dried under vacuum to give 20.0 g. (58% of theory) of 2-nitro-3-amino-5-ethylamino-6-chloropyrazine. A sample recrystallized from ethyl acetate melts at 136–138° C.

Step B.—2-nitro-3-amino-5-ethylamino-6-chloropyrazine (2.18 g., 0.01 mole) in 50 ml. of ethyl acetate is treated with 3.1 ml. (0.022 mole) of triethylamine and 0.2 g. of 5% platinum on carbon catalyst, and is reduced with hydrogen at 25° C. To the mixture is then added 1.3 g. (0.013 mole) of phosgene in 30 ml. of ethyl-acetate. The reaction mixture is treated with dilute hydrochloric acid and the catalyst is removed by filtration. The ethyl acetate layer is separated, dried, and concentrated to a small volume. After aging at 0–5° C., the product, 5-ethylamino-6-chloro-1H-imidazo[4,5-b]pyrazin-2-one, is isolated by filtration; weight 0.96 g. (45% of theory). The product melts with decomposition at 248–249° C.

Employing the procedure described in Example 10, Steps A and B, but substituting for the 3-amino-5-ethylamino-6-chloropyrazinoic acid utilized in Step A, the 3-amino-5-($X_1X_2$CH)(R)N-6-chloro pyrazinoic acids described in Table III followed by reduction and cyclization with phosgene as described in Step B, there are produced the 5-($X_1X_2$CH)(R)N-6-chloro-1H-imidazo[4,5-b]pyrazines also described in Table III.

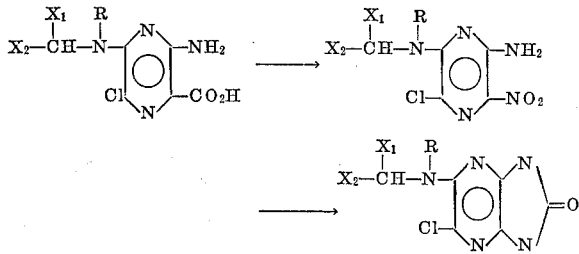

TABLE III

| $X_1$ | $X_2$ | R | Y | M.P. of product |
|---|---|---|---|---|
| H | $(CH_3)_2NCH_2-$ | H | Cl | 219–220 |
| H | $(C_2H_5)_2NCH_2-$ | H | Cl | 276–278 |
| H | $(CH_3)_2N(CH_2)_3-$ | H | Cl | 278–279 |
| H | $CH_3-$ | $C_2H_5-$ | Cl | 207–208 |
| H | $CH_3N\diagdown N-(CH_2)_2-$ | H | Cl | 167–169 |
| H | $O\diagdown N-(CH_2)_2-$ | H | Cl | 154–156 |

What is claimed is:

1. The method of preparing a 5-substituted amino-6-halo-1H-imidazo[4,5-b]pyrazin-2-one of the formula

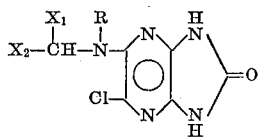

wherein R and $X_1$, each is a member selected from the group consisting of hydrogen and lower alkyl of 1 to 5 carbons; $X_2$ is a member selected from the group consisting of hydrogen, lower alkyl of 1 to 5 carbons, lower (alkoxy-alkyl), phenyl, halo-phenyl, pyridyl, di(lower alkyl)amino-lower alkyl, and di(lower alkyl)amino-lower alkyl wherein the di(lower alkyl) groups can be linked either directly or through a nitrogen or oxygen atom to form a heterocyclic ring of 5 to 6 members, which comprises heating a compound of the formula

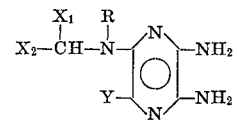

in the presence of a cyclization reagent selected from the group consisting of di(lower alkyl) imino carbonate, di(lower alkyl) carbonate, carbamyl chloride, carbamyl bromide, N-lower alkyl carbamyl chloride, N-lower alkyl carbamyl bromide, N,N-di(lower alkyl) carbamyl chloride, N,N-di(lower alkyl) carbamyl bromide, phosgene, carbonyl dibromide, alkali metal cyanates, urea, lower alkylurea, and lower alkyl haloformates.

2. The method of claim 1 wherein $X_1$ and R are hydrogen and $X_2$ is methyl.

3. The method of claim 1 wherein $X_1$ and R are hydrogen and $X_2$ is lower alkyl of 1 to 5 carbons.

4. The method of claim 1 wherein $X_1$ and R are hydrogen and $X_2$ is di(lower alkyl)amino-lower alkyl.

5. The method of claim 1 wherein the cyclization reactant is a carbamyl chloride or carbamyl bromide.

6. The method of claim 1 wherein the cyclization reactant is urea, or a lower alkyl-urea.

7. The method of claim 1 wherein the cyclization reactant is dichlorocarbonyl or dibromocarbonyl.

8. The method of claim 1 wherein the cyclization reactant is an O,O-di(lower-alkyl) carbonate.

9. The method of claim 1 wherein the cyclization reactant is an alkali metal cyanate.

10. The method of claim 1 wherein the cyclization reactant is a lower alkyl chloroformate or lower alkyl bromoformate.

11. The method of claim 1 wherein the cyclization reactant is O,O-di(lower alkyl) iminocarbonate.

12. A process for the preparation of a 2,3-di-amino-5-substituted amino-6-chloropyrazine of formula

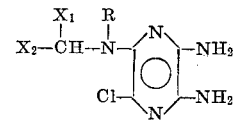

wherein $X_1$, $X_2$ and 3 are as defined in claim 1, which comprises treatment of a compound of formula

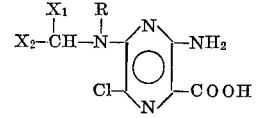

with a mixture of nitric acid and sulfuric acid to give a compound of formula

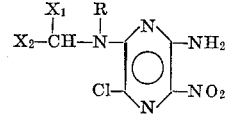

followed by treatment of the nitro compound with hydrogen in the presence of a hydrogenation catalyst selected from the group consisting of platinum, palladium, Raney nickel, and Raney copper.

13. The process according to claim 12, wherein R and $X_1$ are hydrogen, and $X_2$ is methyl.

14. The process according to claim 12, wherein R and $X_1$ are hydrogen, and $X_2$ is di(lower alkyl(amino-lower alkyl.

15. The compound of structural formula

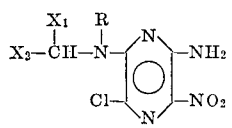

wherein R, $X_1$ and $X_2$ have the meanings assigned to each of them in claim 1.

16. The compound as claimed in claim 15, wherein R is hydrogen, $X_1$ is hydrogen, and $X_2$ is lower alkyl.

17. The compound as claimed in claim 15 wherein R and $X_1$ is each hydrogen, and $X_2$ is methyl.

18. The compound as claimed in claim 15 wherein R and $X_1$ is each hydrogen, and $X_2$ is di(lower alkyl)amino-lower alkyl.

19. The compound of structural formula

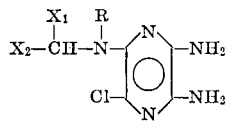

wherein R, $X_1$ and $X_2$ have the meanings assigned to each of them in claim 1.

20. The compound as claimed in claim 19, wherein R and $X_1$ is each hydrogen, and $X_2$ is lower alkyl.

21. The compound as claimed in claim 19, wherein R and $X_1$ is each hydrogen, and $X_2$ is methyl.

22. The compound as claimed in claim 19 wherein R and $X_1$ is each hydrogen and $X_2$ is di(lower alkyl)amino-lower alkyl.

23. The method of claim 1 wherein $X_1$ and R are hydrogen and $X_2$ is di(methyl)aminomethyl.

24. The process according to claim 12, wherein R and $X_1$ are hydrogen, and $X_2$ is di(methyl)aminomethyl.

25. The compound as claimed in claim 15 wherein R and $X_1$ are hydrogen, and $X_2$ is di(methyl)aminomethyl.

26. The compound as claimed in claim 19, wherein R and $X_1$ are hydrogen and $X_2$ is di(methyl)aminomethyl.

References Cited

UNITED STATES PATENTS 3,461,123  8/1969  Jones et al. _____ 260—250

NICHOLAS S. RIZZO, Primary Examiner

U.S. Cl. X.R.

260—247.2, 247.5; 424—250

UNITED STATES PATENT OFFICE
CERTIFICATE OF CORRECTION

Patent No. 3,541,093      Dated November 17, 1970

Inventor(s) Roger J. Tull et al.

It is certified that error appears in the above-identified patent and that said Letters Patent are hereby corrected as shown below:

Column 2, line 71, "hydrooxide" should read -- hydroxide
Column 7, lines 30 to 43, the formulas shoul read:

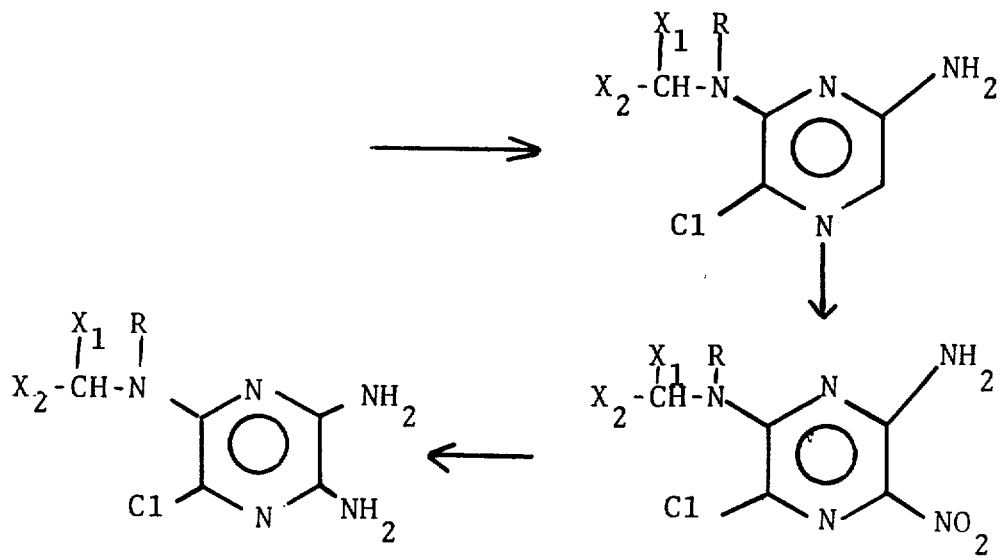

Column 10, line 52, "3" should read -- R --.

Signed and sealed this 13th day of April 1971.

(SEAL)
Attest:

EDWARD M. FLETCHER, JR.
Attesting Officer

WILLIAM E. SCHUYLER, JR.
Commissioner of Patents